United States Patent [19]
Boisset

[11] 4,072,347
[45] Feb. 7, 1978

[54] SEAT SLIDING RUNNER

[75] Inventor: Bernard Boisset, Etampes, France

[73] Assignee: Societe Industrielle Bertrand Faure Brieres-les-Scelles, Etampes, France

[21] Appl. No.: 757,692

[22] Filed: Jan. 7, 1977

[30] Foreign Application Priority Data

Jan. 16, 1976 France .......................... 76 01115

[51] Int. Cl.² .......................................... A62B 35/00
[52] U.S. Cl. .................................. 297/385; 248/429
[58] Field of Search ............... 248/430, 429, 424, 393, 248/394; 308/3 R, 3.8, 3.6, 6 R; 297/385, 216

[56] References Cited

U.S. PATENT DOCUMENTS

| 3,204,916 | 9/1965  | Pickles    | 248/429 |
| 3,207,554 | 9/1965  | Dall       | 297/385 |
| 3,288,422 | 11/1966 | Krause     | 248/429 |
| 3,524,677 | 8/1970  | Louton, Jr.| 297/216 |
| 3,811,727 | 5/1974  | Rumpel     | 297/385 |
| 3,889,913 | 6/1975  | Adams      | 248/430 |
| 3,944,302 | 3/1976  | Fourrey    | 308/3.8 |
| 3,977,725 | 8/1976  | Tengler    | 297/385 |

FOREIGN PATENT DOCUMENTS 1,428,679   3/1976   United Kingdom ................ 297/385

Primary Examiner—James T. McCall
Attorney, Agent, or Firm—Larson, Taylor and Hinds

[57] ABSTRACT

A sliding runner of a particular specified type and supporting a motor vehicle seat is provided with an anchor for the lower end of a safety belt for a passenger on the seat. The sliding runner is one having a lower generally channel section member attached to the vehicle floor and an upper generally inverted channel section member which interfits with the lower channel section member, the upper and lower members co-operating by way of ball races to facilitate movement of the upper member along the lower. The said upper member has secured thereto a jaw member which provides an anchorage for the lower end of a safety belt and which embraces the engaging portions of the said upper and lower members so as to be slidable with the said upper member while resisting disengagement from the sliding runner and hence providing a reliable anchorage for the safety belt.

9 Claims, 4 Drawing Figures

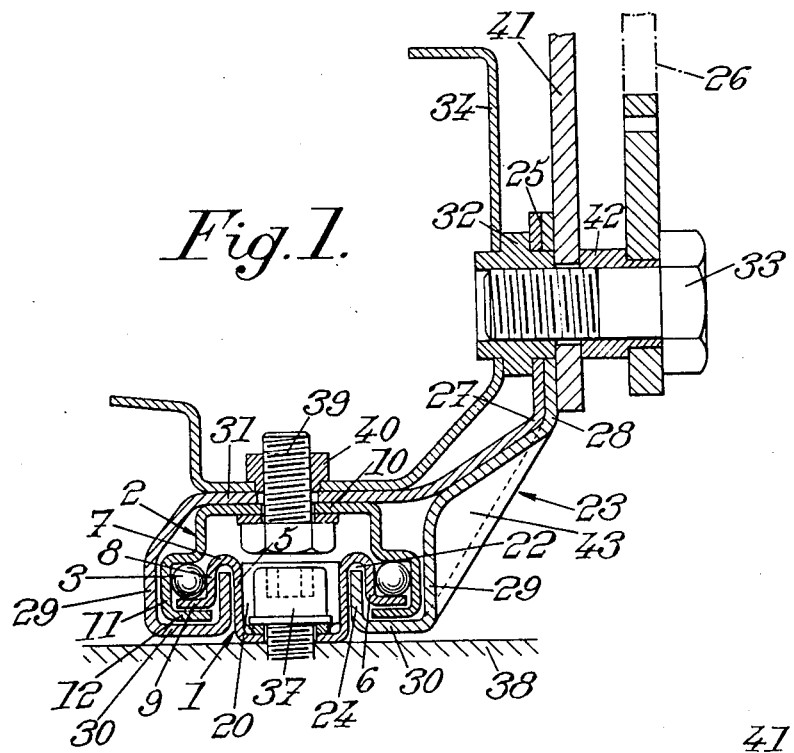
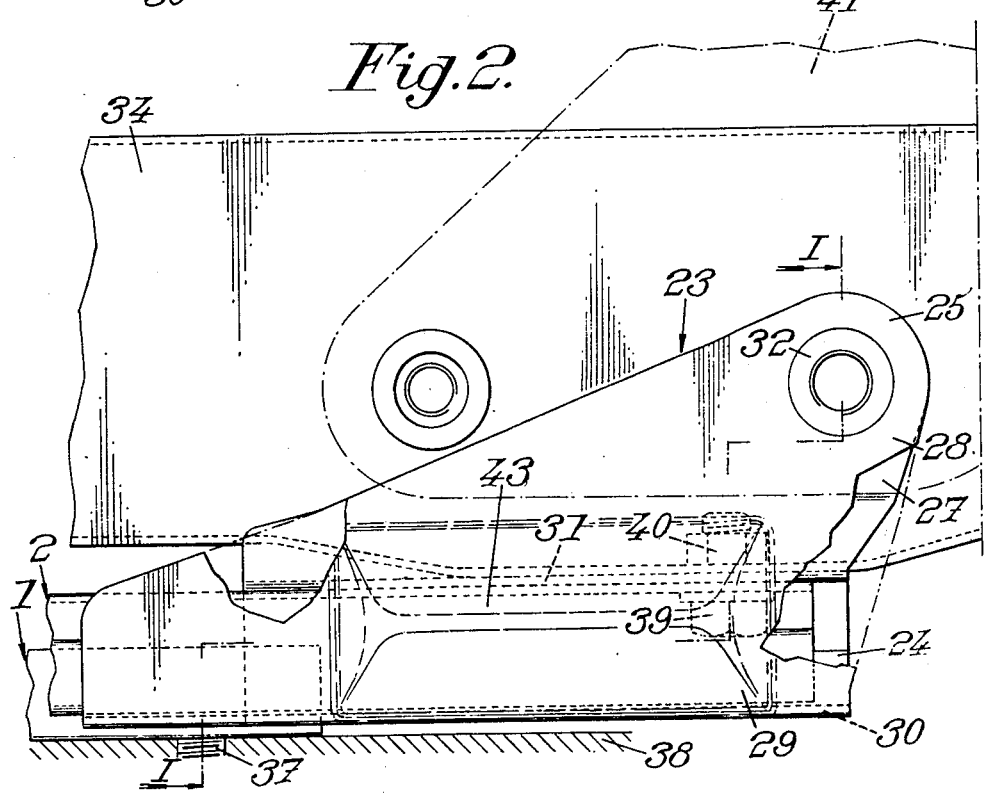

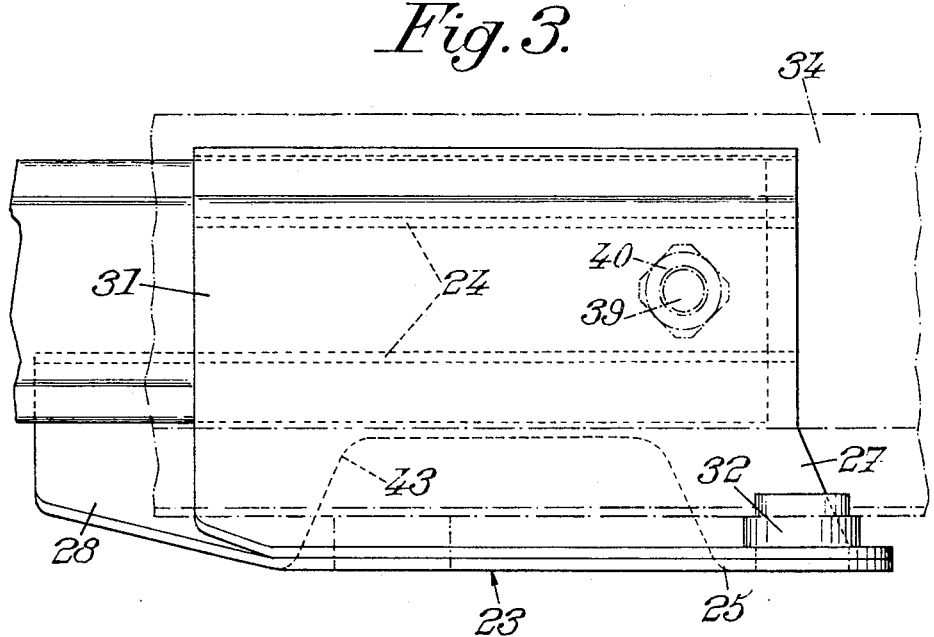
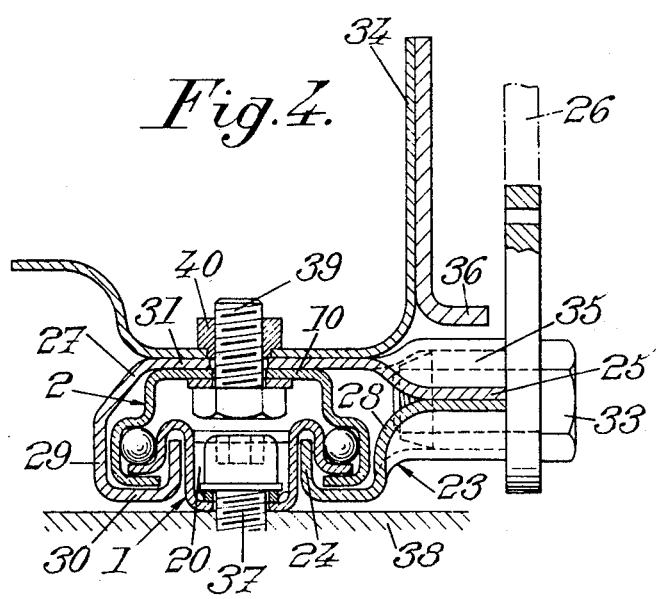

SEAT SLIDING RUNNER

The invention has as its object improvements relating to sliding runners for supporting the front seats of motor vehicles to permit and guide longitudinal sliding of the seats, the sliding runners comprising a lower profiled member fixable to the floor of the vehicle and an upper profiled member adapted to support the seat, the lower and upper profiled members presenting in transverse section respectively the general form of a U and the general form of an inverted U and being fitted one within the other so as to slide mutually the one the length of the other by way of bearing balls.

The said improvements concern such sliding runners in which the two flanks of the lower profiled member are each extended externally by a bent-down portion in the form of an angle iron which has a first web extending downwardly from the top of the said flank, to which it is joined by an arched portion, and a second horizontal web extending outwardly from the bottom of the first flap, the two flanks of the upper profiled member enveloping the bent-down portions of the lower profiled member and each being extended inwardly by a horizontal ledge which extends just below the horizontal web of the corresponding bent-down portion, each ball bearing race being constituted by the two contiguous faces of one bent-down part facing respectively outwards and upwards and by the opposing surfaces of the upper profiled member.

They are aimed more particularly at the case where the arched portion which joins each flank of the upper profiled member to the bentdown portion which extends it externally is of a size sufficient to provide under this arched portion, between the said flank and the said bent-down portion, a downwardly open inverted channel of appreciable size.

It is known that the seats in question should be equipped with safety belts anchored at at least one fixed lower rear point in order to maintain the passengers on these seats despite abrupt changes of speed of the vehicles.

In the known embodiments, these anchoring points are provided on the floor or on the body of the vehicle, this resulting in many inconveniences; these points must in practice be arranged independently of the seats, so that their constructors are not the same as those of the seats; furthermore, because of this independence between the said points and the said seats, any alteration in the longitudinal position of the seat alters the tension of the chest belt and thus requires a fresh adjustment of this tension.

In these known embodiments, it was not envisaged to position these anchoring points on the sliding runner, in particular for the following reasons:

- on the one hand their positioning on the upper profiled member of the sliding runner would not have been compatible with the tolerances generally allowed for the resistance to vertical disengagement of this profiled member from the lower profiled member, the maximum values actually imposed for this resistance to disengagement lying below those which are required for the resistance to uprooting of the anchoring points in question,

- on the other hand, to locate the said points on the lower profiled member of the sliding runner, there is insufficient grip, the anchoring on such a profiled member having to be conceived as a "sliding" type to make possible the sliding of the seat along this lower profiled member without reducing the firmness of the anchoring obtained.

The present improvements have the object, above all, of avoiding these different inconveniences.

They are characterised essentially in that the sliding runners of the type in question are equipped with a jaw member overlapping a portion at the rear of the sliding runner and comprising on the one hand a lateral lug arranged to serve as a lower anchoring point for a safety belt and on the other hand two engagement claw members each extending under the horizontal ledge which extends a flank of the upper profiled member of the sliding runner, each claw member terminating in a turned-up edge which penetrates into the inverted channel formed under the corresponding arched joining portion of the lower profiled member.

In the preferred embodiments one or other of the following features is also used:

— the jaw member is composed of two bent metallic plates juxtaposed at the level of the anchoring ear, one part of each of these plates constituting one of the two engagement claw members with turned-up edges, and one of the said plates comprising a horizontal intermediate flange disposed directly above the upper profiled member and below the framework of the base of the seat supported by the sliding runner, — the framework of the base of the seat supported by the sliding runner comprises an abutment adapted to limit the transverse movement of the jaw member on the application of an intense tractive force by the belt on the lug of the jaw member.

The invention includes, apart from these principal features, certain other features which are preferably used at the same time and which are explained more explicitly below.

In the following, two preferred embodiments of the invention will be described, by way of example only, with reference to the attached drawings.

FIGS. 1, 2 and 3 of these drawings show respectively, in vertical section along lines 1—1 of FIG. 2, in elevation and in plan, a portion of a sliding runner of a vehicle front seat equipped according to the invention with an anchoring jaw member for a safety belt.

And FIG. 4 shows, in vertical section, a variant of a similar sliding runner equipped in an analogous manner.

The sliding runner for the seat comprises:

— a lower profiled member 1 of U shape whose two vertical flanks 5 are each joined by an arched portion 7 to a bent-down part 6 in the form of an angle iron which presents successively a first vertical web 8 and a second horizontal web 9 extending outwardly, — an upper profiled member 2 of inverted U shape whose flanks 11 envelop the bent-down parts 6 and are each extended by a horizontal ledge 12 extending just below the horizontal web of the corresponding bent-down portion, — and bearing balls 3 housed in the two bearing races delimited respectively by each bent-down portion 6 and by the flank 11 which envelops it.

Each arched portion 7 is sufficiently large to provide between the flank 11 and the bent-down part 6 that it joins a downwardly open inverted channel 22 of not insignificant size.

There is provided in addition a jaw member 23 adapted to overlap a portion at the rear of each sliding runner and to engage firmly on the lower profiled member of this sliding runner so as to be able to slide along its length.

To this end, the said jaw member has two retaining members or lips 24 adapted to penetrate upwardly into the two channels 22 respectively.

This jaw member has a lateral lug 25 serving as lower rear anchorage point for a safety belt 26 provided for the seat in question.

The said jaw member is advantageously composed of two metal plates 27 and 28 juxtaposed the one against the other at the level of the lug 25.

Each of these plates 27 and 28 presents a vertical flank 29 extending externally along one of the two flanks 11 of the upper profiled member, the flank being extended below by a horizontal band 30 extending jointly below a ledge 12 of the sliding runner, and each band 30 is itself extended laterally by a turned-up edge which constitutes the retaining member or lip 24 and penetrates into a channel 22 at the engaging ends of the jaw member.

Plate 27 comprises a horizontal flange 31 disposed directly above the top 10 of the upper profiled member 2: this flange joins to the lateral lug 25 the vertical flank 29 of the member, more internal to the seat.

The other plate comprises a reinforcement 43 produced by beating out a relief in its face in the form of a "four pitched roof" which joins its band 30 at the lug 25: it is then one of these "pitches" of this roof which constitutes the vertical flank 29 of the said plate.

In addition abutment means are provided to restrict transverse movement of jaw member 23 under high intensity traction on belt 26, movement which would tend to disengage the jaw member transversely from the sliding runner on which it is engaged.

In the embodiment of FIGS. 1 to 3 the lug 25 is in the form of two end pieces of the plates 27 and 28, each extending in a longitudinal vertical plane (the longitudinal direction being the direction of sliding of the sliding runners), the ends being juxtaposed the one against the other and pierced by coaxial bores of transverse axis provided with the same internally threaded eyelet 32.

In this eyelet 32 is screwed a bolt 33 serving as anchoring member for the belt 26.

The abutment means adapted to hinder the transverse movement of the jaw member 23 are here provided by supporting an annular bearing of the eyelet 32 against the complementary edge of a bore in the casing 34 of the base of the seat.

In the embodiment of FIG. 4, the lug 25 is in the form of two end portions of the plates 27 and 28, deformed to opposed semi-cylindrical form, the vertical juxtaposition of these two end pieces of the plates forming an internally threaded tubular socket 35 of transverse axis.

The anchoring bolt 33 is screwed in this socket.

The abutment means are here constituted by an angle iron 36 secured to the casing 34 and presenting a free edge at a short lateral distance from the edge of the belt anchored on the bolt 33.

There will be seen also on the figures:
— screws 37 firmly fixing the lower profiled member 1 on the floor 38 of the vehicle,
— a rigid undulating band 20 housed within the lower profiled member 1 for preventing the two flanks from approaching one another,
— a bolt 39 - nut 40 system for fixing the casing 34 on the top 10 of the upper profiled member 2, with the flange 31 there between, — a vertical bracket 41 mounted on the casing 34 for supporting the back of the seat and its transverse axis of articulation, the said bracket having therethrough many bolts, such as bolt 33, screwed to the casing 34,
— and a spacing washer 42 mounted as necessary on the bolt 33 to maintain the belt 26 slightly spaced from this bracket 41, in the embodiment of FIGS. 1 to 3.

In each case, there is a rigid and solid connection between the two plates 27 and 28 and the upper profiled member 2. This is effected not only by the bolt-nut systems 33–32 and 39–40, but also by soldering of the flange 31 to the top 10 which supports it and by soldering of the plates 27 and 28 in their juxtaposed positions.

Experience shows that, for each of the two above embodiments, the resistance to uprooting of the anchoring points thus obtained under the tension of the belt is remarkable.

Accordingly, and whatever the embodiment adopted, there are finally obtained improved sliding runners providing a very solid anchorage for the lower rear ends of safety belts.

Such structures have amongst others the following advantages:
— the possibility of installing the anchoring points for the seats at the same time, and by the same constructors, as the seats and their supporting sliding runners, independently of the vehicle chassis to be equipped.
— avoidance of adjustment of the tension of the chest safety belt on adjustment of the longitudinal position of the seats.

As is evident, and as follows from the above, the invention is not limited solely to those embodiments which have been particularly described; it embraces, on the contrary, all variations.

I claim

1. In a sliding runner supporting a motor vehicle seat, said sliding runner comprising: a lower profiled member of generally channel section having opposed flanks extended externally by respective angle section members and respective arched portions joining said angle section members to said flanks, each said angle section member having a first web extending downwardly from the corresponding arched portion and a second web extending outwardly from the bottom of the first web; means attaching said lower profiled member to the floor of the vehicle; an upper profiled member of generally inverted channel section having opposed flanks enveloping said angle section members of said lower profiled member and being extended inwardly by respective inwardly-directed ledges which extend below said outwardly extending webs of the respective angle section members of said lower profiled member; and ball races facilitating sliding of said upper profiled member along said lower profiled member and defined between each said flank of said upper profiled member and the corresponding angle section member of said lower profiled member, the improvement which comprises:

a. each said flank of said lower profiled member defining with its corresponding arched portion and first web a downwardly open inverted channel, and
 b. a jaw member embracing said upper profiled member and means securing said jaw member to said upper profiled member, said jaw member having a lateral lug constituting a lower anchoring point for a safety belt and respective walls which extend inwardly below the inwardly extending ledges of the upper profiled member and which terminate in respective turned up edges penetrating into the said downwardly open inverted channels provided by said lower profiled member.

2. A sliding runner according to claim 1 wherein the jaw member comprises two formed metal plates juxtaposed at one region constituting said lateral lug, one part of each said plate forming a said wall of said jaw member and one of said plates including an intermediate horizontal flange positioned directly above said upper profiled member and below said seat.

3. A sliding runner according to claim 1 further including abutment means limiting transverse movement of said jaw member.

4. A sliding runner according to claim 2 wherein said lateral lug is constituted by vertical longitudinal juxtaposed end portions of said two plates, said lateral lug having a transverse bore therethrough and a complementary internally threaded eyelet being fitted in said bore.

5. A sliding runner according to claim 4 wherein said seat has a casing and said threaded eyelet is supported directly on said casing.

6. A sliding runner according to claim 2 wherein said lateral lug is constituted by end portions of said two plates shaped to respective opposed semi-cylinders, said semi-cylinders being juxtaposed and forming a socket and said socket being threaded.

7. A sliding runner according to claim 6 wherein said seat has a casing, an abutment member being secured to said casing and extending transversely adjacent to said safety belt anchored on said jaw member.

8. A sliding runner according to claim 2 wherein the plate, other than said plate which includes said intermediate horizontal flange, has formed therein a reinforcing portion having the relief of a four pitched roof.

9. A sliding runner according to claim 2 including a soldered joint between said intermediate horizontal flange and said upper profiled member and a soldered joint between said plates where said plates are juxtaposed.

* * * * *